United States Patent [19]

Perichaud et al.

[11] Patent Number: 4,904,742

[45] Date of Patent: Feb. 27, 1990

[54] BINDERS RESISTANT TO FOULING AND ORGANISMS PRESENT IN AN AQUEOUS MEDIUM AND PROCESS FOR THEIR PREPARATION

[75] Inventors: Alain Perichaud; Georges Sauvet, both of Marseille, France

[73] Assignee: Universite de Provence, Marseille, France

[21] Appl. No.: 114,004

[22] Filed: Oct. 29, 1987

[30] Foreign Application Priority Data

Oct. 30, 1986 [FR] France ................. 86 15300

[51] Int. Cl.$^4$ ............................................ C08F 8/32
[52] U.S. Cl. .................... 525/331.4; 524/236; 524/251; 524/567; 524/568; 525/331.5; 525/332.8; 525/332.9; 525/333.1; 525/333.2; 525/379
[58] Field of Search ............. 525/331.4, 331.5, 332.8, 525/332.9, 333.1, 333.2; 524/251, 236, 567, 568

[56] References Cited

U.S. PATENT DOCUMENTS 3,867,315 2/1975 Tigner et al. ................. 524/398
4,113,679 9/1978 Audrascheck et al. ........... 524/567
4,377,481 3/1983 Jakabhazy ...................... 521/27
4,454,219 6/1984 Yumadera et al. ............... 430/281

FOREIGN PATENT DOCUMENTS 0156632 10/1985 European Pat. Off. .
2010851 4/1979 United Kingdom .

Primary Examiner—Joseph L. Schofer
Assistant Examiner—Bernard Lipman
Attorney, Agent, or Firm—Browdy and Neimark

[57] ABSTRACT

Binders comprising the association of chlorinated vinyl resins and quaternary ammonium salts are resistant to corrosion, fouling, and organisms in an aqueous medium.

The binders are obtained by substituting the chlorines of the polymer with a molecule having a primary or secondary amine function and a tertiary amine function, and then quaternizing the tertiary amine function by an alkyl halide.

The binders thus obtained are useful in the production of coatings resistant to fouling and organisms present in an aqueous medium, of bacterial anticorrosion coatings and coatings with fungicidal properties.

17 Claims, No Drawings

BINDERS RESISTANT TO FOULING AND ORGANISMS PRESENT IN AN AQUEOUS MEDIUM AND PROCESS FOR THEIR PREPARATION

FIELD OF THE INVENTION

This invention relates to binders resistant to fouling and organisms present in an aqueous medium as well as to a process for their preparation.

BACKGROUND OF THE INVENTION

In this description, these binders will be more especially described in their applications to paints or coatings resistant to marine fouling, without this constituting a limitation in any way, since they will also find many advantageous applications if they are applied alone.

The marine organisms which accumulate on marine underwater surfaces cause an increase of weight and roughness, which constitutes a major problem of ship maintenance both for large-tonnage ships and for fishing and pleasure boats. This phenomenon is more generally known under the name of "fouling."

The fight against marine fouling is now carried out by incorporation of biocidal agents (generally tin salts) in protective paints. The biocidal agents are slowly salted out in the marine medium, so they have a limited effectiveness in time and pollution problems.

EP-A-0 156 632 describes a copolymer comprising acrylic or methacrylic esters which can optionally contain quaternary ammonium functions, but the latter, according to the authors, are not bioactive groups responsible for antifouling activity. Introduction of a hydrolyzable ester is claimed to facilitate erosion of the copolymer. Moreover, the copolymer contains organotin compounds introduced by copolymerization (tributyltin methacrylate, TBTM) which are responsible for the antifouling activity.

FR-A-2 510 121 describes a chemical modification of chlorinated natural rubber intended to make it compatible with polyamides which are claimed to be used for their antifouling activity. Chlorinated natural rubbers are now used in anticorrosion primers, but they do not relate to antifouling finishing coats. Generally, chlorinated polymers are often used in binders for marine paints because of their mechanical behavior and their good resistance to water, but they do not intervene in antifouling properties.

The partial prohibition against using antifouling paints containing tin salts, which are toxic elements for marine organisms of plant or animal origin, has been one of the factors inciting inventors to develop replacement paints not exhibiting these defects.

SUMMARY OF THE INVENTION

Thus, the object of the invention is to propose novel binders for coatings resistant to fouling and organisms present in an aqueous medium whose originality consists in the fact that they consist essentially of the association of quaternary ammonium salts and chlorinated vinyl resins.

In a first embodiment, quaternary ammonium salts are incorporated into a coating composition by mixing with chlorinated vinyl resins at a rate of 10 to 20% by weight.

Advantageously, and according to another embodiment of the invention, the quaternary ammonium salts are grafted by a nonhydrolyzable covalent bond onto a chlorinated vinyl resin.

In this second case, the biocidal group acts by contact and, because it is not salted out, it does not exhibit the risk of pollution, particularly for the surrounding medium.

The chlorinated vinyl resin according to the invention is selected from the group consisting of polyvinyl chloride, postchlorinated polyvinyl chloride, polyvinylidene chloride, as well as copolymers of vinyl chloride or from chlorinated rubbers.

Grafting of quaternary ammonium salts on a chlorinated vinyl resin was performed in two steps:

The first step consists in substituting chlorides of the polymer with a molecule comprising a primary or secondary function and a tertiary amine function:

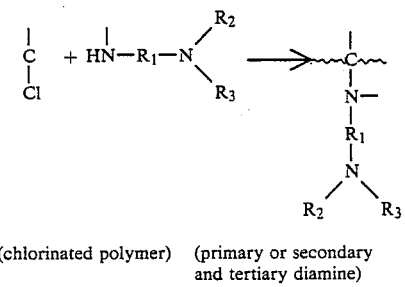

(chlorinated polymer)  (primary or secondary and tertiary diamine)

The second step is the quaternization of the tertiary amine function by an alkyl halide:

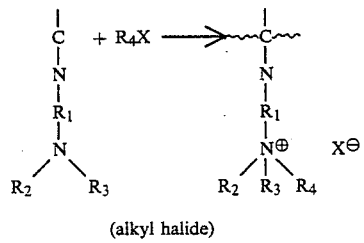

(alkyl halide)

During the first step of the synthesis, the substitution reaction is in competition with a reaction of elimination of HCl (dehydrochlorination).

Therefore, it was necessary to find a compromise in the experimental conditions so that the substitution/elimination ratio would be most favorable.

It was determined that the percentage of elimination could be reduced to the benefit of the substitution reaction by buffering the medium to lower the pH by about one unit, for example, by adding solid carbon dioxide or para-toluenesulfonic acid.

In the case where $R_1$ is an aromatic group, very high substitution rates (greater than 50%) could be observed practically without any elimination.

Further, to minimize the risks of oxidation and degradation of the products, a perfectly anhydrous amine must be used and, if possible, handled under inert atmosphere.

The first step can be performed in solution in dimethyl sulfoxide (DMSO), in tetrahydrofuran (THF), xylene or in bulk, the resins being soluble in most of the amines used. In this case, the amine acts both as a solvent and reagent in great excess. The concentration of the resin in the amine can reach several moles per liter.

The length of the reaction is obviously linked to the temperature.

Preferably, the operation is at about thirty degrees below the boiling temperature of the amine (temperature at which the proportion of the substitution relative to the elimination is better).

The length of the reaction goes from several days in solution to several hours in bulk.

At the end of the reaction, it can be advantageous to concentrate the medium by distillation under vacuum of the excess amine to facilitate precipitation. The latter is performed depending on the resin considered and the rate of substitution attained either in an excess of methanol or in a great excess of water or better of salt water with vigorous stirring.

By addition of a solvent such as acetone, dichloromethane, chloroform, etc., the medium can be diluted then the mixture poured into water. The polymer remains on the surface of the aqueous phase and it is easy then to rinse it with water several times, by decanting, until a neutral pH is attained (all amine which has not reacted and which gives this basic pH must be eliminated). The polymer is then filtered and dried under vacuum.

Before precipitation, it is thus possible to recover more than 80% by volume of amine that has not reacted (and therefore to concentrate the reaction mixture more). The medium then becomes very viscous. By addition of a solvent (one volume of reaction medium concentrated to 80% per two volumes, for example, of acetone), this medium can be diluted then this solution can be poured into water; the polymer is then in the form of more or less fine powder or fiber, depending on the amount of water, the rate of stirring, the temperature, etc.

At times it is necessary to cool the concentrated reaction medium when acetone is added to it. This acetone can react on the residual amine and give rise to an exothermic reaction. It is also possible to replace acetone with dichloromethane, chloroform or any other solvent of the polymer.

To isolate the polymer after the first step, it is also possible to proceed as follows: the reaction medium, after concentration of 50% by volume by distillation of the excess amine, is poured into the water with stirring. The poorly defined precipitate (coarse grains, sticky product) and swollen with water (very considerable water retention) is then taken up with xylene. By extraction and decanting, this xylene phase is rinsed with salt water to a neutral pH. This organic phase is then dried over a mineral drying agent. The polymer, in solution in xylene, can then be treated directly in a second step (as will be described in example 5). (Optionally the medium can be concentrated by removing the excess xylene by distillation.) Instead of drying the xylene phase, it is also possible to proceed to an azeotropic distillation which will eliminate the water.

The recovered polymer quantitatively is generally entirely soluble in solvents such as xylene, dichloromethane, chloroform, acetone, THF. It can also be purified by successive precipitation and dissolution.

During the second step of this synthesis, an alkyl halide reacts on the tertiary amine function coming from the first step to lead to a quaternary ammonium salt grafted on the resin.

This alkyl halide can be octyl, lauryl, benzyl bromide, etc., including a long linear or aromatic carbon chain.

This reaction can be performed in solution in the xylene, methyl isobutyl ketone, or methanol conventionally used by paint manufacturers or performed in bulk in case the polymer obtained is soluble in the alkyl halide. The concentration of polymer in the medium can amount to several moles per liter.

The reaction temperature can reach 100° C., but it is preferable to be at a temperature on the order of 60°–80° C. to avoid degradation of the product.

The length of the reaction can go up to several hours if a considerable conversion rate is desired.

Several times the formation of an insoluble gelled fraction is observed, which is greater the higher the temperature and the longer the reaction time.

The reaction medium is then poured into an excess of aliphatic hydrocarbon ($C_5$–$C_7$). The polymer is isolated by filtering, then dried. The polymer can be purified by redissolution in chloroform, for example, then by reprecipitation in a great excess of heptane. It is advisable to work under inert gas to avoid any risk of alteration of the product.

When this second step is performed in xylene solution, it is not necessary to precipitate the polymer; the latter can be used directly for the formulation of paint (marine paints generally contain xylene, methyl isobutyl ketone and methanol).

Only a concentration of the medium may be necessary before delivery of the binder to the paint manufacturers, by distilling off the excess xylene.

Within the framework of their studies and to determine the properties of antifouling paints according to the invention, a simple test has been developed, making it possible to measure the rate at which a material submerged in seawater is covered with bacteria (the latter constitute a first deposit on which multicellular organisms are then fixed). A count of bacteria, taken from samples of several $cm^2$ and cultured, makes it possible to obtain the number of bacteria deposited per $cm^2$ as a function of time.

DETAILED DESCRIPTION OF THE INVENTION

This invention will now be better understood and its advantages will be better understood from the following examples which illustrate it without limiting it in any way.

EXAMPLE 1

To a solution of 1 g of commercial PVC (purified by successive dissolution and precipitation) in 10 ml of THF is added 0.1 g of octyl trimethyl ammonium chloride (3% by moles relative to the PVC).

Small plates of several $cm^2$ are dipped in this mixture. By evaporation of the solvent, films are obtained which cease to be sticky after forty eight hours. These small plates are immersed in a pan of natural seawater. The number of bacteria deposited at the end of seven days is twenty six times less than that of a reference sample (untreated PVC film).

Under the same conditions, a commercial paint with a base of tin salts exhibits a reduction of the number of bacteria by a factor of 80.

EXAMPLE 2

There is dissolved 3 g of commercial PVC purified by successive dissolution and precipitation (0.048 mole) in 150 ml of DMSO. he dissolution can be accelerated by heating to 50° C. 30.2 ml of 3-dimethylaminopropylamine (0.24 mole) is added at once. The mixture is stirred for six days at ambient temperature.

The yellow polymer, recovered by precipitation in an excess of methanol, is soluble in chloroform and THF. According to its NMR $^1$H spectrum, it comprises 12.5% of grafted 3-dimethylaminopropylamine group. The rate of dehydrochlorination is 15%.

One gram of this amine polymer is dissolved in 100 ml of THF, and 5.44 ml of octyl chloride (0.032 mole) is added. The solution is brought to 60° C. over a period of twenty four hours with stirring. Under these conditions, the partial formation of a gel is observed during the reaction. The soluble fraction (about 70% by weight) is precipitated in a large excess of n-heptane. The polymer, soluble in chloroform and in aromatic solvents, according to its NMR $^1$H spectrum, exhibits a rate of quaternary ammonium of molar 7.5% (or a yield of 60% relative to the tertiary amine functions present). The rate of dehydrochlorination is unchanged.

Small plates of some cm$^2$ are covered with a film of this resin, deposited by coating with chloroform solution. The varnish obtained, which is flexible and bright, is no longer sticky after several hours. The plates are immersed in a basin of natural seawater. The number of bacteria deposited after twenty eight days is eighteen times less than that of a reference sample (untreated PVC film).

Under the same conditions, a commercial marine paint with a base of tin salts causes a reduction of the number of bacteria by a factor of 44.

EXAMPLE 3

In this example, fixing of the dimethylaminopropyl groups is performed as follows: 0.75 g of PVC is dissolved in 30 ml of dimethylaminopropylamine. The mixture is brought to 100° C. over a period of four hours with stirring. At the end of the reaction, about two thirds of the excess amine is eliminated by distillation under vacuum. The concentrated solution is then poured into an excess of salt water. The yellow orange polymer obtained is soluble in chloroform and THF. According to its NMR $^1$H spectrum, it comprises 27% of fixed dimethylaminopropylamine groups and the rate of dehydrochlorination is 31%.

The quaternization step is then performed under the conditions described in example 2.

Application of a film of the resin thus obtained to small plates of some cm$^2$ gives results comparable to those described in example 2.

EXAMPLE 4

1.5 g of a copolymer with a base of vinyl chloride and vinyl isobutyl ether (resin LAROFLEX MP 35 of BASF) is dissolved in 60 ml of dimethylaminopropylamine.

The mixture is brought to 100° C. over a period of four hours with stirring.

Recovery of the polymer is performed under the conditions described in example 3.

The yellow polymer is soluble in chloroform, methylene chloride, THF and acetone. According to its NMR $^1$H spectrums, it comprises 11% of dimethylaminopropylamine groups, the rate of dehydrochlorination being 12.5%.

1.2 g of this polymer is dissolved in 30 ml of octyl chloride. After four hours of reaction at 80° C., the solution is concentrated by distillation under vacuum of two thirds of the excess octyl chloride.

The polymer is then precipitated in a great excess of heptane. Its NMR $^1$H spectrum indicates the presence of molar 5.5% of fixed quaternary ammonium groups.

The product obtained, tested under the conditions described in example 2, gives comparable results.

EXAMPLE 5

56 g of LAROFLEX MP 35 of BASF is dissolved in 320 ml of dimethylaminopropylamine. In two hours the mixture is brought to 100° C. with stirring. Up to 80% by volume of the unreacted amine is recovered by distillation under vacuum.

120 ml of acetone is slowly added with stirring and cooling in ice water and the solution is slowly poured into 500 ml of water with stirring.

The yellow polymer, having a fibrous appearance, floats on the surface and it is rinsed with water, by decanting, to a neutral pH. It is filtered and dried under vacuum.

40 g of this polymer is added, with vigorous stirring, to a solution of 30 g of xylene, 20 g of methyl isobutyl ketone and 10 g of methanol.

Then 18.5 g of octyl bromide is added and heated to 60° C. for eight hours. The binder thus prepared is added to other standard ingredients of a paint such as fillers, plasticizers, pigments, and the like.

The plates, covered with this paint and submerged for several months in the sea, exhibit an appearance remarkably free of marine fouling in comparison with plates covered with antifouling paints having a base of tin salts.

The binders obtained for embodying the process described above make it possible to obtain, once the standard ingredients of paints and especially solvents, pigments, etc. are added, antifouling paints whose biocidal effectiveness, comparable with that of standard paints with a base of tin salts, does not exhibit the drawbacks usually encountered with the latter, particularly with regard to pollution, which constitutes a very important advance in the field of marine paints, and more generally, for all coatings intended to be in contact with an aqueous medium containing living organisms such as bacteria, fungi, yeasts, algae, shellfish, and the like.

These binders therefore also find advantageous applications in the field of bacterial anticorrosion coatings, as well as in the field of coatings with fungicidal properties.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A layer of coating comprising a binder which repels micro-organisms when said binder is in contact with an aqueous medium, said binder consisting essentially of a mixture of a chlorinated vinyl resin selected from the group consisting of polyvinyl chloride, postchlorinated polyvinyl chloride, polyvinylidine chloride and copolymers thereof, and chlorinated rubbers, and 10-20% by weight based on the weight of said resin of a quaternary ammonium salt having at least one substituent selected from the group consisting of linear alkyl and aryl long-chain carbon derivatives.

2. A layer of coating according to claim 1 wherein said quaternary ammonium salt is octyl trimethyl ammonium chloride.

3. A layer of coating according to claim 1 wherein said chlorinated vinyl resin is polyvinyl chloride.

4. A layer of coating according to claim 3 wherein said quaternary ammonium salt is octyl trimethyl ammonium chloride.

5. A binder capable of repelling micro-organisms when in contact with an aqueous medium, comprising a chlorinated vinyl resin selected from the group consisting of polyvinyl chloride, postchlorinated polyvinyl chloride, polyvinylidine chloride and copolymers thereof, and chlorinated rubbers, said vinyl resin having grafted thereon a quaternary ammonium salt by a non-hydrolyzable covalent bonding.

6. A binder according to claim 5 wherein said grafted quaternary ammonium salt comprises a primary or secondary amine function between the quaternary ammonium atom and the chlorinated vinyl resin chain.

7. A binder according to claim 5 wherein said quaternary ammonium salt has at least one long chain substituent selected from the group consisting of linear alkyl and aryl.

8. A binder according to claim 7 wherein said long chain is selected from the group consisting of octyl, lauryl and benzyl.

9. A binder according to claim 5 wherein said quaternary ammonium salt has at least one long chain substituent selected from the group consisting of linear alkyl and aryl, and said alkyl or aryl group is disposed between two nitrogen atoms of said quaternary ammonium salt.

10. A layer of coating having bactericidal and fungicidal activity and comprising a binder according to claim 5.

11. In an anti-fouling marine paint comprising a binder and a volatile carrier, the improvement wherein said binder is the binder of claim 5.

12. A marine paint according to claim 11 wherein said grafted quaternary ammonium salt comprises a primary or secondary amine function between the quaternary ammonium atom and the chlorinated vinyl resin chain.

13. A marine paint according to claim 11 wherein said quaternary ammonium salt has at least one long chain substituent selected from the group consisting of linear alkyl and aryl.

14. A marine paint according to claim 11 wherein said long chain is selected from the group consisting of octyl, lauryl and benzyl.

15. In an anti-fouling marine paint comprising a binder and a volatile carrier, the improvement wherein said binder comprises a mixture of a chlorinated vinyl resin selected from the group consisting of polyvinyl chloride, postchlorinated polyvinyl chloride, polyvinylidine chloride and copolymers thereof, and chlorinated rubbers, and 10–20% by weight based on the weight of said resin of a quaternary ammonium salt having at least one substituent selected from the group consisting of linear alkyl and aryl long-chain carbon derivatives.

16. A layer of coating according to claim 15 wherein said quaternary ammonium salt is octyl trimethyl ammonium chloride.

17. A layer of coating according to claim 15 wherein said chlorinated vinyl resin is polyvinyl chloride.

* * * * *